(12) United States Patent
Cao et al.

(10) Patent No.: US 11,506,780 B2
(45) Date of Patent: Nov. 22, 2022

(54) INTELLIGENT ROADSIDE UNIT AND CONTROL METHOD THEREOF

(71) Applicant: BAIDU ONLINE NETWORK TECHNOLOGY (BEIJING) CO., LTD., Beijing (CN)

(72) Inventors: Huo Cao, Beijing (CN); Lei Fang, Beijing (CN); Xing Hu, Beijing (CN); Yifeng Shi, Beijing (CN); Sheng Tao, Beijing (CN); Haisong Wang, Beijing (CN)

(73) Assignee: Apollo Intelligent Driving Technology (Beijing) Co., Ltd., Beijin (CN)

( * ) Notice: Subject to any disclaimer, the term of this patent is extended or adjusted under 35 U.S.C. 154(b) by 599 days.

(21) Appl. No.: 16/550,688

(22) Filed: Aug. 26, 2019

(65) Prior Publication Data

US 2020/0072967 A1 Mar. 5, 2020

(30) Foreign Application Priority Data

Aug. 31, 2018 (CN) .......................... 201811014579.1

(51) Int. Cl.
*G01S 13/931* (2020.01)
*G05D 1/00* (2006.01)
(Continued)

(52) U.S. Cl.
CPC .......... *G01S 13/931* (2013.01); *G05D 1/0088* (2013.01); *G05D 1/0094* (2013.01); *G05D 1/024* (2013.01); *G06V 20/58* (2022.01)

(58) Field of Classification Search
CPC .................................................. H04N 5/2624
See application file for complete search history.

(56) References Cited

U.S. PATENT DOCUMENTS

| 4,247,858 A | * | 1/1981 | Eichweber | ............ | G01S 13/762 343/729 |
| 7,982,662 B2 | * | 7/2011 | Shaffer | ................. | G01S 7/4813 250/203.1 |

(Continued)

FOREIGN PATENT DOCUMENTS

| CN | 101303798 A | 11/2008 |
| CN | 202472948 U | 10/2012 |

(Continued)

OTHER PUBLICATIONS

Japanese Patent Application No. 2019-158593, Office Action dated Nov. 4, 2020, 7 pages.

(Continued)

*Primary Examiner* — Bernarr E Gregory
(74) *Attorney, Agent, or Firm* — Lathrop GPM LLP (57) ABSTRACT

The present disclosure describes an intelligent roadside unit and a control method thereof, comprising: a circular camera array, including a plurality of cameras for capturing images in different road directions respectively; a circular radar array, including a plurality of radars for detecting obstacle information in different road directions respectively; and a controller configured to determine whether a vehicle is approaching according to the obstacle information detected by the radars, to turn on a camera corresponding to the radar that has detected the approaching of the vehicle to capture an image, and to control the cameras corresponding to the radars that have not detected the approaching of the vehicle to be in a standby state.

10 Claims, 3 Drawing Sheets

(51) Int. Cl.
   *G05D 1/02* (2020.01)
   *G06V 20/58* (2022.01)
   *G01S 13/00* (2006.01)

(56) References Cited

U.S. PATENT DOCUMENTS

| | | | |
|---|---|---|---|
| 8,106,936 B2* | 1/2012 | Strzempko | H04N 5/2624 |
| | | | 348/36 |
| 10,386,476 B2* | 8/2019 | Li | G01S 13/931 |
| 2003/0179084 A1* | 9/2003 | Skrbina | G01S 13/931 |
| | | | 340/522 |
| 2016/0125713 A1 | 5/2016 | Blech et al. | |
| 2017/0372602 A1 | 12/2017 | Gilliland et al. | |

FOREIGN PATENT DOCUMENTS

| | | |
|---|---|---|
| CN | 203165036 U | 8/2013 |
| CN | 203260072 U | 10/2013 |
| CN | 105072320 A | 11/2015 |
| CN | 105522998 A | 4/2016 |
| CN | 105679043 A | 6/2016 |
| CN | 107240263 A | 10/2017 |
| CN | 206638815 U | 11/2017 |
| CN | 107527506 A | 12/2017 |
| CN | 207133867 U | 3/2018 |
| CN | 207133934 U | 3/2018 |
| CN | 107945530 A | 4/2018 |
| CN | 108007346 A | 5/2018 |
| CN | 108010360 A | 5/2018 |
| DE | 29817795 U1 | 1/1999 |
| EP | 2290634 A1 | 3/2011 |
| EP | 2629237 A1 | 8/2013 |
| JP | 2005309705 A | 11/2005 |
| JP | 2012242317 A | 12/2012 |
| JP | 2014052861 A | 3/2014 |
| JP | 2014180046 A | 9/2014 |
| JP | 2017033371 A | 2/2017 |
| JP | 2017097783 A | 6/2017 |
| WO | WO 2017210791 A1 | 12/2017 |

OTHER PUBLICATIONS

Japanese Patent Application No. 2019-158593, English translation of Office Action dated Nov. 4, 2020, 7 pages.
Chinese Patent Application No. 201811014579.1, First Office Action dated Aug. 5, 2020, 12 pages.
Chinese Patent Application No. 201811014579.1, English translation of First Office Action dated Aug. 5, 2020, 11 pages.
Japanese Patent Application No. 2019-158593, Office Action dated Aug. 3, 2021, 6 pages.
Japanese Patent Application No. 2019-158593, English translation of Office Action dated Aug. 3, 2021, 6 pages.
European Patent Application No. 19194301.8, extended Search and Opinion dated Jan. 31, 2020, 9 pages.
Japanese Patent Application No. 2019-158593, Decision on Rejection dated Mar. 22, 2022, 5 pages.
Japanese Patent Application No. 2019-158593, English translation of Decision on Rejection dated Mar. 22, 2022, 5 pages.

* cited by examiner

INTELLIGENT ROADSIDE UNIT AND CONTROL METHOD THEREOF

CROSS REFERENCE TO RELATED APPLICATION

This application claims priority to Chinese Patent Application No. 201811014579.1, filed with the State Intellectual Property Office of P. R. China on Aug. 31, 2018, the entire contents of which are incorporated herein by reference.

TECHNICAL FIELD

The present disclosure relates to the technical field of intelligent transportation, and more particularly, to an intelligent roadside unit and a control method thereof.

BACKGROUND

Presently, an intelligent roadside unit is an important support for automatic driving. As requirement on intelligence level of the intelligent roadside unit increases, requirement on the sensing capability of the intelligent roadside unit is also increasing, which requires addition of various sensors in the intelligent roadside unit to improve the active sensing capability of the intelligent roadside unit. However, since the intelligent roadside unit requires high accuracy in the detection of obstacles, the radar needs to have very high accuracy, resulting in high costs of the intelligent roadside unit.

Therefore, at present, it is a challenge to reduce the cost of the intelligent roadside unit. In addition, since the intelligent roadside unit works for a long term, reducing the amount of data operations in the intelligent roadside unit may not only improve the stability of the system but also save energy.

SUMMARY

The present disclosure aims at solving at least one of the technical problems in the related art to some extent.

To this end, a first object of the present disclosure is to provide an intelligent roadside unit that reduces required costs while ensuring the required accuracy through a circular radar array arranged therein. In addition, controlling cameras according to detection results of radars may reduce the amount of data processing, greatly decrease energy consumption required by the intelligent roadside unit, and improve the stability of the intelligent roadside unit.

To achieve the above object, certain embodiments according to a first aspect of the present disclosure provide an intelligent roadside unit, including: a circular camera array, including a plurality of cameras for capturing images in different road directions respectively; a circular radar array, including a plurality of radars for detecting obstacle information in different road directions respectively; and a controller configured to determine whether a vehicle is approaching according to the obstacle information detected by the radars, to turn on a camera corresponding to the radar that has detected the approaching of the vehicle to capture an image, and to control the cameras corresponding to the radars that have not detected the approaching of the vehicle to be in a standby state.

The intelligent roadside unit according to certain embodiments of the present disclosure captures images in different road directions respectively by the circular camera array including the plurality of cameras, and detects the obstacle information in different road directions respectively by the circular radar array including the plurality of radars, and determines by the controller whether a vehicle is approaching according to the obstacle information detected by the radars, turns on a camera corresponding to the radar that has detected the approaching of the vehicle to capture an image, and controls the cameras corresponding to the radars that have not detected the approaching of the vehicle to be in a standby state. The present disclosure reduces the required costs while ensuring the required accuracy through the circular radar array arranged therein. In addition, controlling the cameras according to detection results of the radars may reduce the amount of data processing, greatly decrease the energy consumption required by the intelligent roadside unit, and improve the stability of the intelligent roadside unit.

In addition, the intelligent roadside unit according to certain embodiments of the present disclosure further comprises the following technical features.

Alternatively, the plurality of radars in the circular radar array may be millimeter-wave radars or laser radars.

Alternatively, when an obstacle detected by a radar is gradually approaching the intelligent roadside unit, it is determined that the approaching of the vehicle is detected.

Alternatively, the intelligent roadside unit further comprises: a shielding layer which encloses at least part of the camera.

Alternatively, the controller generates a point cloud image according to the image captured by the camera and the obstacle information detected by the radars.

Alternatively, the intelligent roadside unit further comprises: a communication unit connected to the controller, the controller being configured to transmit the point cloud image to a driverless vehicle or a server in the vicinity of the intelligent roadside unit through the communicator.

Alternatively, the intelligent roadside unit further comprises: traffic lights, which are controlled by the controller according to the point cloud image.

To achieve the above object, embodiments according to a second aspect of the present disclosure provide a control method, comprising the following steps of: capturing, by a circular camera array including a plurality of cameras, images in different road directions; detecting, by a circular radar array including a plurality of radars, obstacle information in different road directions respectively; and determining, by a controller, whether there is a vehicle approaching according to the obstacle information detected by the radars, turning on a camera corresponding to the radar that has detected the approaching of the vehicle to capture an image, and controlling the cameras corresponding to the radars that have not detect the approaching of the vehicle to be in a standby state.

The control method according to embodiments of the present disclosure captures images in different road directions respectively by the circular camera array including the plurality of cameras, and detects the obstacle information in different road directions respectively by the circular radar array including the plurality of radars, and determines by the controller whether there is a vehicle approaching according to the obstacle information detected by the radars, turns on a camera corresponding to the radar that has detected the approaching of the vehicle to capture an image, and controls the cameras corresponding to the radars that have not detected the approaching of the vehicle to be in a standby state. The present disclosure reduces the required costs while ensuring the required accuracy through the circular radar array arranged therein. In addition, controlling the cameras according to detection results of the radars may reduce the amount of data processing, greatly decrease the energy consumption required by the intelligent roadside unit, and improve the stability of the intelligent roadside unit To achieve the above objective, embodiments according to a third aspect of the present disclosure provide a computer device, including: a processor; and a memory for storing instructions executable by the processor; wherein the processor runs a program corresponding to executable program codes through reading the executable program codes stored in the memory, and the processor is configured to implement the control method according to embodiments of the second aspect.

To achieve the above object, embodiments of a fourth aspect of the present disclosure provide a non-transitory computer readable storage medium having a computer program stored thereon, wherein the program is executed by a processor, the program implements the control method according to embodiments of the second aspect of the present disclosure.

To achieve the above object, embodiments of a fifth aspect of the present disclosure provide a computer program product. The control method according to embodiments of the second aspect of the present disclosure is implemented when an instruction processor in the computer program product is executed.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Embodiments of the present disclosure will be described below in detail, examples of which are illustrated in accompanying drawings. Throughout the drawings, the same or similar reference signs refer to the same or similar elements or elements that have the same or similar functions. The embodiments described below with reference to the accompanying drawings are merely exemplary and intends to illustrate and explain the present disclosure, and should not be construed as a limit to the present disclosure.

Based on the above description, it may be understood that with the rapid development of the automatic driving technology, the requirements for the accuracy in the obstacle detection of the intelligent roadside unit are increasing, which requires radars which a higher accuracy, resulting in high costs of the intelligent roadside unit. And since the intelligent roadside unit works for a long term, reducing the amount of data operations in the intelligent roadside unit is another problem to be solved.

Embodiments of the present disclosure provide an intelligent roadside unit, comprising: a circular camera array, including a plurality of cameras for capturing images in different road directions respectively; a circular radar array, including a plurality of radars for detecting obstacle information in different road directions respectively; and a controller configured to determine whether there is a vehicle approaching according to the obstacle information detected by the radars, to turn on a camera corresponding to the radar that has detected the approaching of the vehicle to capture an image, and to control the cameras corresponding to the radars that have not detected the approaching of the vehicle to be in a standby state.

Hereinafter, the intelligent roadside unit and the control method thereof according to certain embodiments of the present disclosure are described with reference to the drawings.

The intelligent roadside unit according to embodiments of the present disclosure may be applied to a driverless vehicle.

Figure 1:
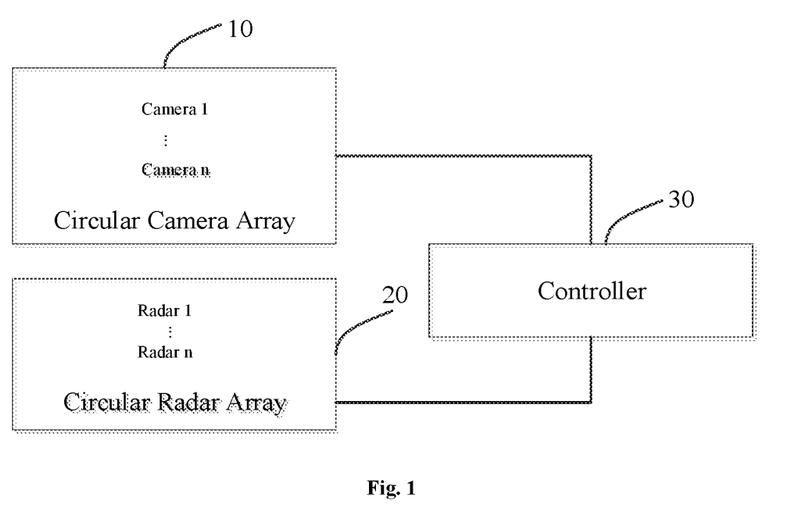
FIG. 1 is a schematic diagram of an intelligent roadside unit according to an embodiment of the present disclosure.

FIG. 1 is a schematic diagram of an intelligent roadside unit according to embodiments of the present disclosure. As shown in FIG. 1, the intelligent roadside unit comprises a circular camera array 10, a circular radar array 20 and a controller 30.

The circular camera array 10 includes a plurality of cameras for capturing images in different road directions respectively.

The circular radar array 20 includes a plurality of radars for detecting obstacle information in different road directions respectively.

The controller 30 is configured to determine whether there is a vehicle approaching according to the obstacle information detected by the radars, to turn on a camera corresponding to the radar that has detected the approaching of the vehicle to capture an image, and to control the cameras corresponding to the radars that have not detected the approaching of the vehicle to be in a standby state.

Specifically, one or more cameras may be provided for capturing images according to practical requirements. In the embodiments of the present disclosure, the plurality of cameras may be arranged as a circular camera array for capturing images in different road directions respectively.

As a scenario implementation, the intelligent roadside unit according to the embodiments of the present disclosure may be applied to a vehicle A, in which the circular camera array 10 may capture images within a certain range from the vehicle A (for example, images of other vehicles, pedestrians, intersection indication lights, etc. that are less than one meter away from the vehicle A).

Specifically, one or more radars may be provided for detecting the obstacle information according to practical requirements. In the embodiments of the present disclosure, the plurality of radars may be arranged as a circular radar array for detecting the obstacle information in different road directions respectively.

As a scenario implementation, the intelligent roadside unit according to embodiments of the present disclosure may be applied to vehicle A, in which the circular radar array 20 may detect the obstacles within a certain range from the vehicle A (for example, obstacles such as other vehicles, pedestrians, road signs, etc. that are less than one meter away from the vehicle A).

It may be understood that the image information and the obstacle information may be obtained for as many different road directions as possible according to practical application requirements, so as to further improve the reliability of the intelligent roadside unit.

The plurality of radars in the circular radar array may be millimeter-wave radars or laser radars. Consequently, since the cost of the millimeter-wave radars is lower than that of the laser radars, the circular radar array may be arranged as a circular millimeter-wave radar array, which may reduce the required costs while ensuring the desired accuracy.

Specifically, the controller may determine whether there is a vehicle approaching according to the obstacle information detected by the radars. As a possible implementation, when an obstacle detected by the radars is gradually approaching the intelligent roadside unit, it is determined that the approaching of the vehicle is detected.

Furthermore, a camera corresponding to the radar that has detected the approaching of the vehicle is turned on to capture an image. Those cameras corresponding to the radars that have not detected the approaching of the vehicle are controlled to be in a standby state.

For example, when a light sensor detects that the night is coming, a night mode is enabled. In the night mode, there are fewer vehicles on the road. If all of the plurality of cameras are turned on at this time, the amount of computation would be increased unnecessarily, while other problems such as reduced reliability and increased power consumption may also be caused. Therefore, according to the present disclosure, in the night mode, the cameras may be controlled according to the obstacle information detected by the radars. That is, only a camera directed to a direction in which the approaching of the vehicle is detected is turned on, while the rest cameras are in a standby state, thereby reducing the amount of data to processed and greatly decreasing the required energy consumption.

The intelligent roadside unit according to embodiments of the present disclosure captures images in different road directions respectively with a circular camera array including a plurality of cameras, detects obstacle information in different road directions respectively with a circular radar array including a plurality of radars, and determines whether there is a vehicle approaching according to the obstacle information detected by the radars, turns on a camera corresponding to the radar that has detected the approaching of the vehicle to capture an image, and controls the cameras corresponding to the radars that have not detected the approaching of the vehicle to be in a standby state with a controller. With the circular radar array, the present disclosure may reduce the required costs while ensuring the required accuracy. In addition, the cameras are controlled according to the detection results from the radars, which may reduce the amount of data to be processed, and greatly decreases the energy consumption required by the intelligent roadside unit, improving the stability of the intelligent roadside unit.

Figure 2:
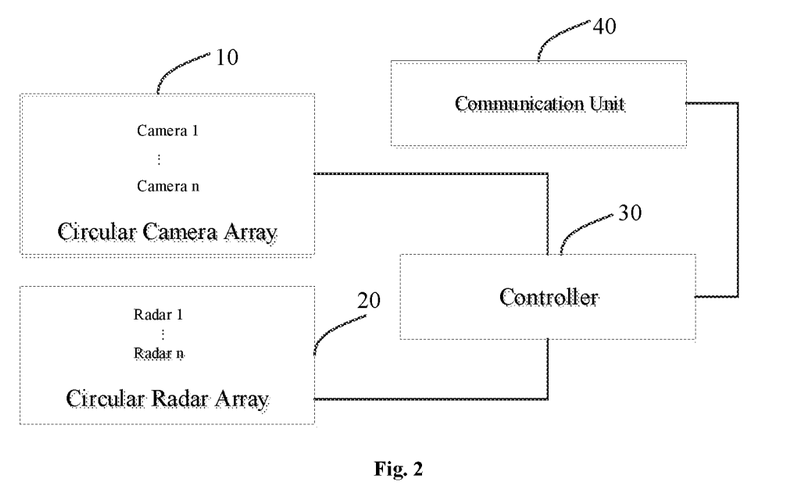
FIG. 2 is a schematic diagram of an intelligent roadside unit according to another embodiment of the present disclosure.

FIG. 2 is a schematic diagram of an intelligent roadside unit according to another embodiment of the present disclosure. As shown in FIG. 2, on the basis of FIG. 1, the intelligent roadside unit further comprises a communication unit 40.

In an embodiment of the present disclosure, the controller 30 may generate a point cloud image according to an obstacle detection signal and an image detection signal.

The communication unit 40 is connected to the controller 30. The controller 30 is configured to transmit the point cloud image to a driverless vehicle or a server in the vicinity of the intelligent roadside unit through the communication unit 40.

The communication unit 40 may be an antenna or a wireless connection device, or the like.

Figure 3:
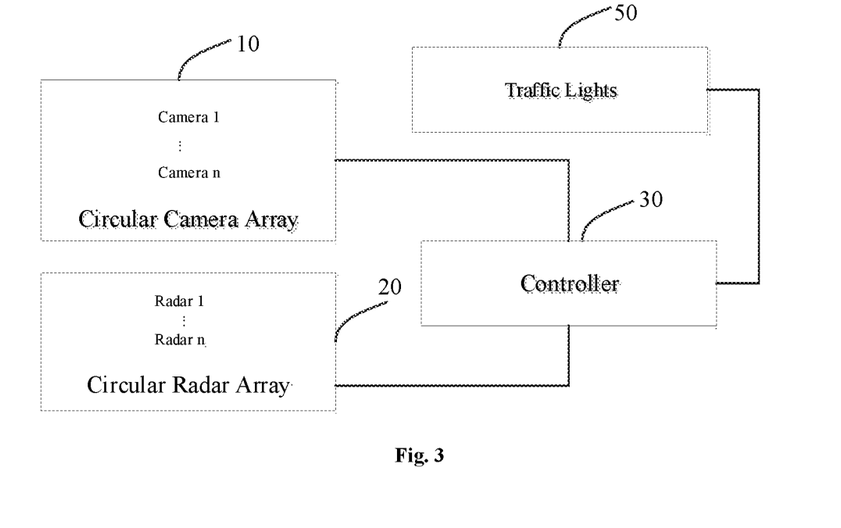
FIG. 3 is a schematic diagram of an intelligent roadside unit according to yet another embodiment of the present disclosure.

FIG. 3 is a schematic diagram of an intelligent roadside unit according to yet another embodiment of the present disclosure. As shown in FIG. 3, on the basis of FIG. 1, the intelligent roadside unit further comprises traffic lights 50.

Specifically, the controller 30 is configured to control the traffic lights 50 according to the point cloud image. Consequently, the applicability of the intelligent roadside unit is further improved.

In an embodiment of the present disclosure, the intelligent roadside unit further includes a shielding layer wrapped around at least part of the camera.

As a possible implementation, a shielding layer may be provided to enclose the camera except for a lens portion and a heat dissipation portion.

Consequently, by enclosing the camera except for the lens portion and the heat dissipation portion with the shielding layer, the interference to the camera that is caused by components such as the radars and the antenna may be eliminated, which may increase imaging resolution of the camera 20 and further improve the reliability of the intelligent roadside unit.

Figure 4:
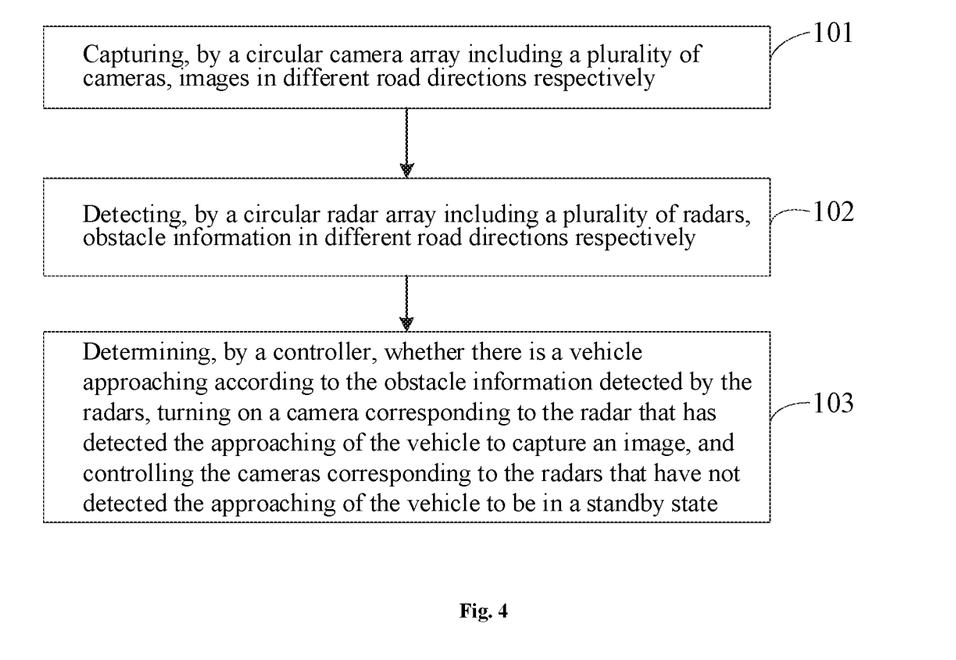
FIG. 4 is a flowchart of a control method according to an embodiment of the present disclosure.

FIG. 4 is a flowchart of a control method according to an embodiment of the present disclosure. As shown in FIG. 4, the control method includes the following steps.

In step 101, the circular camera array captures images in different road directions. The circular camera array includes a plurality of cameras.

In step 102, the circular radar array detects obstacle information in different road directions respectively. The circular radar array includes a plurality of radars.

In step 103, the controller determines whether there is a vehicle approaching according to the obstacle information detected by the radars, turns on a camera corresponding to the radar that has detected the approaching of the vehicle to capture an image, and controls the cameras corresponding to the radars that have not detected the approaching of the vehicle to be in a standby state.

The control method according to embodiments of the present disclosure captures images in different road directions respectively with a circular camera array including a plurality of cameras, detects obstacle information in different road directions respectively with a circular radar array including a plurality of radars, and determines whether there is a vehicle approaching according to the obstacle information detected by the radars, turns on a camera corresponding to the radar that has detected the approaching of the vehicle to capture an image, and controls the cameras corresponding to the radars that have not detected the approaching of the vehicle to be in a standby state with a controller. With the circular radar array, the present disclosure may reduce the required costs while ensuring the required accuracy. In addition, the cameras are controlled according to the detection results from the radars, which may reduce the amount of data to be processed, and greatly decreases the energy consumption required by the intelligent roadside unit, improving the stability of the intelligent roadside unit.

It should be noted that the foregoing description of the embodiments of the intelligent roadside unit is also applicable to the control method of this embodiment, and details are not described herein again.

To implement the above embodiments, the present disclosure further proposes a computer device, including a processor and a memory. The processor may read out executable program codes stored in the memory to execute a program corresponding to the executable program codes for implementing the control method according to the above embodiments.

Figure 5:
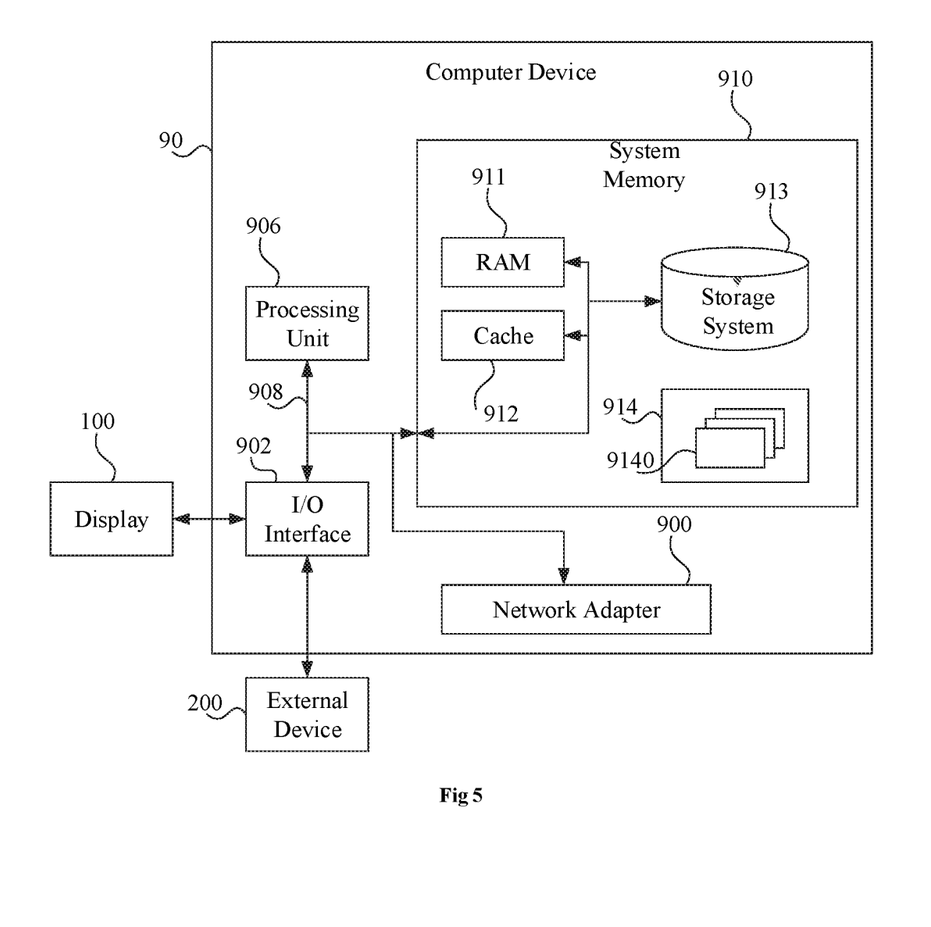
FIG. 5 is a schematic diagram of a computer device according to an embodiment of the present disclosure.

FIG. 5 is a schematic diagram of a computer device according to an embodiment of the present disclosure, illustrating a block diagram of an exemplary computer device 90 adapted for implementing the embodiments of the present disclosure. The computer device 90 shown in FIG. 5 is merely an example and is not intent to impose any limitation on the function and usage of the embodiments of the present disclosure.

As illustrated in FIG. 5, the computer device 90 is implemented as a general-purpose computer device. Components of the computer device 90 may include, but not limited to, one or more processors or processing units 906, a system memory 910, and a bus 908 connecting various system components (including the system memory 910 and the processing unit 906).

The bus 908 may be implemented as one or more bus architectures, including a storage device bus or a storage device controller, a peripheral bus, an accelerated graphics port, a processor, or a local bus with any of the bus architectures. For example, the bus architectures include, but not limited to, an industry subversive alliance (ISA) bus, a micro channel architecture (MAC) bus, an enhanced ISA bus, a video electronics standards association (VESA) local bus and a peripheral component interconnect (PCI) bus.

The computer device 90 typically includes various computer system readable media. These media may be any available medium that may be accessed by the computer device 90, including volatile and non-volatile media, removable and non-removable media.

The system memory 910 may include a computer system readable medium in the form of a volatile memory, such as a random access memory (RAM) 911 and/or a cache memory 912. The computer device 90 may further include other removable/non-removable and volatile/non-volatile computer system storage media. As an example only, a storage system 913, may be configured to read from or write to a non-removable and non-volatile magnetic medium (not shown in FIG. 5, and generally referred as a "hard disk drive"). Although not shown in FIG. 5, a magnetic-disk drive configured to read from or write to a removable and nonvolatile magnetic disk (for example, a "floppy disk"), and an optical-disk drive configured to read from or write to a removable and nonvolatile optical disk, such as a compact disc read-only memory (CD-ROM), a digital video disc-read only memory (DVD-ROM), or other optical media, may be provided. In those cases, each driver may be connected to the bus 908 through one or more data medium interfaces. The system memory 910 may include at least one program product having a set of (e.g., at least one) program modules configured to perform functions in respective embodiments of the present disclosure.

A computer readable signal medium may include a data signal that is propagated in a baseband or as part of a carrier, carrying computer readable program codes. The data signal propagated in this manner may adopt a plurality of forms including, but not limited to, an electromagnetic signal, an optical signal, or any suitable combination thereof. The computer readable signal medium may also be any computer readable medium other than a computer readable storage medium. The computer readable medium may send, propagate, or transmit a program to be utilized by or in connection with an instruction execution system, apparatus, or device.

Program codes contained in the computer readable medium may be transmitted over any suitable media, including but not limited to a wireless connection, a wired connection, a fiber optic cable, RF, or any suitable combination thereof.

Computer program codes for performing the operations of the present disclosure may be written in one or more programming languages, or a combination thereof, including an object-oriented programming language such as Java, Smalltalk, C++, and conventional procedural programming languages such as the C language or the like. The program codes may be entirely executed on the user's computer, partly executed on the user's computer, executed as a stand-alone software package, executed partly on the user's computer and partly on a remote computer, or entirely executed on the remote computer or terminal.

A program/utility 914 including a set of (at least one) program modules 9140 may be stored, for example, in the system memory 910. Such program modules 9140 include, but not limited to, an operation system, one or more applications, other program modules and program data. Each or a certain combination of the examples may include an implementation of a network environment. The program module 9140 typically performs the functions and/or methods in the embodiments described herein.

The computer device 90 may further communicate with one or more external devices 200, such as a keyboard, a pointing device, a display 100, or the like, and may also communicate with one or more terminals that enable the user to interact with the terminal device 90, and/or communicate with any terminals, such as a network card, a modem, or the like, that enable the computer device 90 to communicate with one or more other computer terminals. Such communication may be implemented through an input/output (I/O) interface 902. In addition, the computer device 90 may also communicate with one or more networks, such as a local area network (LAN), a wide area network (WAN), and/or a public network, such as the Internet, through the network adapter 900. As shown in FIG. 5, the network adapter 900 communicates with other modules of the computer device 90 through the bus 908. It should be understood that although not shown in FIG. 5, other hardware and/or software modules may be utilized in combination with the computer device 90, including but not limited to: a microcode, a terminal driver, a redundant processor, an external disk drive array, a redundant-arrays-of-independent-disks (RAID) system, a tape drive, and a data backup storage system.

The processing unit 906 performs various functional applications and data processing by running programs stored in the system memory 910, for example, for implementing the control method mentioned in the above embodiments.

To implement the above embodiments, the present disclosure further proposes a non-transitory computer readable storage medium having a computer program stored thereon, wherein when the program is executed by a processor, the program implements the control method according to the above embodiments of the present disclosure.

To implement the above embodiments, the present disclosure further proposes a computer program product for implementing the control method according to the above embodiments of the present disclosure. when instructions in the computer program product is executed by a processor.

Throughout the description of the present disclosure, terminologies "an embodiment", "some embodiments", "an example", "a specific example", or "some examples", means that features, structures, materials, or characteristics described in connection with the embodiment(s) or example(s) may be included in at least one embodiment or example of the present disclosure. Thus, the illustrative description for the above terminologies in this disclosure is not necessarily directed to the same embodiment or example. Furthermore, the specific features, structures, materials, or characteristics described herein may be combined in any suitable manner in one or more embodiments or examples. If not contradictory, different embodiments or examples and features in the different embodiments or examples may be combined by those skilled in the art.

In addition, terminologies such as "first" and "second" are used herein for purposes of description and are not intended to indicate or imply relative importance or significance, or indicate or imply the number of the indicated technical features. Furthermore, the feature defined with "first" and "second" may comprise at least one of the features distinctly or implicitly. In the description of the present disclosure, "a plurality of" means at least two, such as two or three, unless stated definitely and specifically.

Any procedure or method described in the flow charts or described in any other way herein may be understood as including one or more modules, sections or parts of executable codes for implementing custom logic functions or procedures. Moreover, preferred embodiments of the present disclosure comprises other implementations in which the functions may be performed in an order rather than the order depicted or discussed, including in a substantially simultaneous manner or in an inversed order according to the related functions, which should be understood by those skilled in the art.

The logics and/or steps shown in the flow chart or in other manners described herein, for example, may be regarded as an ordered list of executable instructions for implementing the logical functions, and may be embodied in any computer readable medium to be used by an instruction execution system, apparatus or device, such as a system based on a computer, a system including processors, or other systems capable of fetching and executing instructions from the instruction execution system, apparatus or device, or to be used in combination with the instruction execution system, apparatus or device. Here, the terminology "computer readable medium" may refer to any means configured for containing, storing, communicating, propagating or transmitting programs to be used by or in combination with the instruction execution system, apparatus or device. More specific examples of the computer readable medium comprise but not exhaustively: an electronic connection (an electronic device) with one or more wires, a portable computer disk cartridge (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even include a paper or other appropriate medium with those programs printed thereon, which, for example, may be optically scanned and then edited, interpreted or processed in other appropriate way when necessary so as to obtain the programs in an electrical manner and to store it in the computer memories.

It should be understood that respective parts of the present disclosure may be implemented by hardware, software, firmware or a combination thereof. In the above embodiments, a plurality of steps or methods may be implemented by software or firmware stored in a memory and executed by an appropriate instruction execution system. For example, if it is implemented by hardware, as in another embodiment, it may be implemented by any one of the following techniques known in the art or a combination thereof: a discrete logic circuit including logic gate circuits for implementing logic functions for data signals, an application-specific integrated circuit including an appropriate combination of logic gate circuits, a programmable gate array (PGA), a field programmable gate array (FPGA), etc.

Those skilled in the art may understand that all or part of the steps in the above methods according to the embodiments of the present disclosure may be implemented by instructing relevant hardware through programs. The programs may be stored in a computer readable storage medium, and implement one of the steps in the method according to embodiments of the present disclosure, or a combination thereof, when it is executed.

In addition, respective functional units in respective embodiments of the present disclosure may be integrated in one processing module, or may be presented as physically separated units, or may be implemented as two or more unites integrated in one module. The above integrated module may be implemented in hardware or as a software functional module. When the integrated module is implemented as a software function module and is sold or used as a standalone product, it may be stored in a computer readable storage medium.

The storage medium mentioned above may be read-only memories, magnetic disks, CDs, etc. Although explanatory embodiments have been illustrated and described, it is to be understood that the above embodiments are only illustrative and should not be construed to limit the present disclosure. Those skilled in the art may make changes, alternatives, and modifications to the embodiments without departing from the spirit, principles and scope of the present disclosure.

What is claimed is:

1. An intelligent roadside unit, comprising:
a circular camera array, including a plurality of cameras for capturing images in different road directions respectively;
a circular radar array, including a plurality of radars for detecting obstacle information in different road directions respectively; and
a controller configured to determine whether there is a vehicle approaching according to the obstacle information detected by the radars, to turn on a camera corresponding to the radar that has detected the approaching of the vehicle to capture an image, and to control the cameras corresponding to the radars that have not detected the approaching of the vehicle to be in a standby state.

2. The intelligent roadside unit according to claim 1, wherein the plurality of radars in the circular radar array are millimeter-wave radars or laser radars.

3. The intelligent roadside unit according to claim 1, wherein when an obstacle detected by a radar of said plurality of radars is gradually approaching the intelligent roadside unit, the controller determines that the approaching of the vehicle is detected.

4. The intelligent roadside unit according to claim 1, further comprising:
a shielding layer which encloses at least part of the camera.

5. The intelligent roadside unit according to claim 1, wherein the controller generates a point cloud image according to the image captured by the camera and the obstacle information detected by the radars.

6. The intelligent roadside unit according to claim 5, further comprising:
a communication unit connected to the controller, the controller being configured to transmit the point cloud image to a driverless vehicle or a server in the vicinity of the intelligent roadside unit through the communication unit.

7. The intelligent roadside unit according to claim 6, further comprising:
   traffic lights, which are controlled by the controller according to the point cloud image.

8. The intelligent roadside unit according to claim 1,
   wherein the images captured by the circular camera array includes images of other vehicles, pedestrians, or intersection indication lights within a certain range from vehicle, and
   the obstacle information detected by the circular radar array includes information about other vehicles, pedestrians, or road signs within a certain range from the vehicle.

9. A control method for an intelligent roadside unit, comprising the following steps:

capturing, by a circular camera array including a plurality of cameras, images in different road directions respectively;
   detecting, by a circular radar array including a plurality of radars, obstacle information in different road directions respectively; and
   determining, by a controller, whether there is a vehicle approaching according to the obstacle information detected by the radars, turning on a camera corresponding to the radar that has detected the approaching of the vehicle to capture an image, and controlling the cameras corresponding to the radars that have not detected the approaching of the vehicle to be in a standby state.

10. A non-transitory computer readable storage medium having a computer program stored thereon, wherein, when the program is executed by a processor, the program implements the control method according to claim 9.

* * * * *